UNITED STATES PATENT OFFICE.

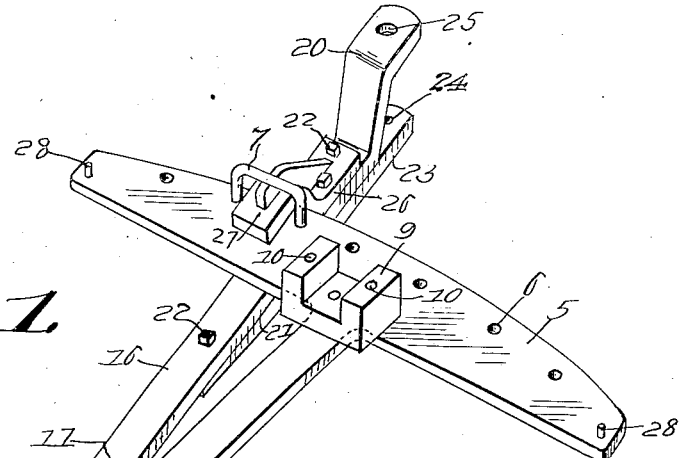
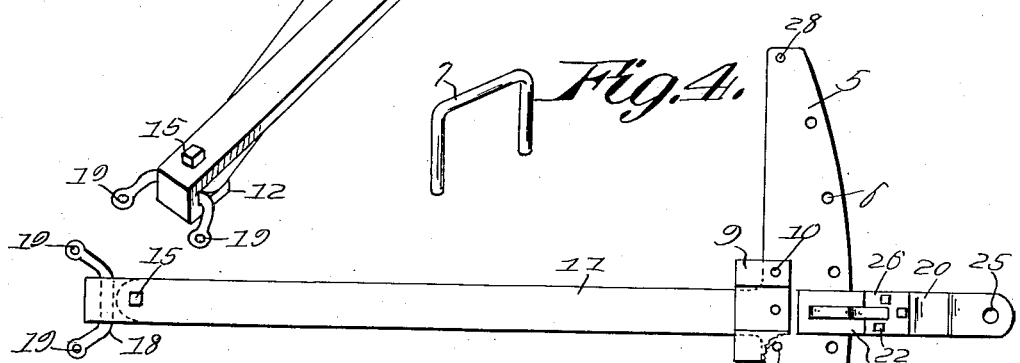
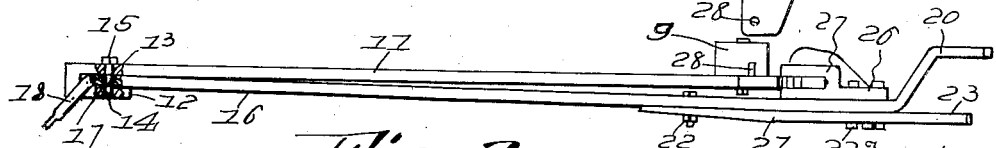

HEBER F. TOWNER, OF SANTA ANA, AND GEORGE DUNTON, OF ANAHEIM, CALIFORNIA.

TRACTOR DRAFT-RIGGING.

1,362,154.  Specification of Letters Patent.  Patented Dec. 14, 1920.

Application filed March 17, 1920. Serial No. 366,492.

*To all whom it may concern:*

Be it known that we, HEBER F. TOWNER, and GEORGE DUNTON, citizens of the United States of America, and residents of Santa Ana and Anaheim, respectively, in the county of Orange and State of California, have invented certain new and useful Improvements in Tractor Draft-Rigging, of which the following is a specification.

This invention relates to draft rigging for tractors and particularly to an attachment adapted to be secured to the tractor and with relation to which a draw-bar may oscillate.

An object of the invention is to produce a draft rigging for tractors having a means of anchorage in the middle of said tractor so as to increase its strength, and a device which provides a radius for the draw-bar, thus allowing the coupling of a tractor with its load with a shorter hitch than is possible by devices now in common use.

A still further object of the invention is to produce a draft rigging having means of novel character for securing the draw-bar at different positions of adjustment with relation to a tongue or rigid member which is secured to the tractor.

A still further object of the invention is to produce a draft rigging of the character indicated which will prove comparatively inexpensive and which can be readily and easily installed or removed.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, in which like characters denote corresponding parts in the several views and in which—

Figure 1 is a perspective view of the draft rigging embodying the invention;

Fig. 2 is a top plan view thereof with the parts re-adjusted and with the fastening omitted;

Fig. 3 is a side elevation of the device; and

Fig. 4 is a perspective view of the fastener for holding the draw-bar in different positions.

In these drawings 5 denotes a sway bar having a series of apertures 6 in which the ends of a guard or retaining member 7 may be inserted for the purpose of holding the draw-bar (to be hereinafter described), at different positions of adjustment.

The sway bar has apertures such as 8 through which bolts may extend for attaching the sway bar to the rear of a tractor, and there is also a spacing block 9 having apertures such as 10 alining with the apertures 8 through which the bolt or fastening is extended for anchoring the sway bar to the rear of a tractor.

The sway bar preferably has an integral tongue 11 with its outer end turned back to form a loop 12, the said tongue and turned back portion having apertures 13 and 14 respectively in which a pin 15 is seated, the said pin constituting a fulcrum for the draw-bar 16, which draw-bar has an aperture 17 to receive the said pin 15. The end of the tongue is also supplied with a bracket 18 having apertures 19 in its end to receive fastenings or bolts (not shown) by which the front end of the tongue may be secured to the crank case of the tractor, in some types of which, bolt holes are formed in the crank case which can be caused to receive the said bolts. The draw-bar has an upwardly and outwardly projecting end 20 extending beyond the sway bar, and a plate 21 is secured to the said draw-bar by fastenings 22 such as bolts, the said plate having an extension 23 provided with an aperture 24. The extension 20 is also provided with an aperture 25 and these apertures are intended to receive a king pin or coupling pin by which the rear end of the draw-bar may be connected to the load or trailer.

From the fact that the extension 20 is higher than the extension 23, it follows that the coupling or hitch may be made on different planes to suit the location of the coupling member on the trailer.

A plate 26 is secured on the draw-bar by certain of the bolts 22, and this plate has a jaw 27 which embraces the edge of the sway bar and is slidable with relation to the sway bar and acts as a support for the draw-bar, it being obvious that the draw-bar carrying the plate may be oscillatable with respect to the sway bar and then secured at different positions of adjustment by inserting the ends of the retaining device 7 in two of the apertures 6, according to the position of adjustment desired.

By reason of the arrangement just described, the draft line may be changed to suit particular requirements, or if desired, the retaining member may be omitted, in which event, the jaws could move around on the sway bar so that the draw-bar would always have a straight line pull with relation to the direction of travel of the tractor.

There are studs 28, one at each end of the sway bar which form an abutment for the jaw to limit the movement of the draw-bar with relation to the sway bar and to prevent the disengagement of the jaw from the said sway bar.

The construction of the apparatus and the manner of attaching it to a tractor will, it is thought, be understood from the foregoing description, and as a description of the functions of the elements have been given in connection with a description of the said elements, a résumé of the operation is believed to be unnecessary, as those skilled in the art will understand how to carry the invention into practice.

I claim—

1. In a draft rigging, a sway bar having a tongue with its end turned back and spaced from the tongue, a draw-bar having its ends pivoted in the space between the tongue and the said turned back portion, means pivotally mounting the said tongue in the position stated, means for anchoring the tongue to a tractor, a spacing block on the sway bar, the said sway bar and spacing block having coinciding apertures to receive fastenings for attaching the sway bar to a tractor, and means for guiding the draw-bar with relation to the sway bar.

2. In a draft rigging, a sway bar having apertures near one edge thereof, and a tongue extending from said sway bar, a draw-bar pivotally connected to the tongue, a jaw on the draw-bar embracing the sway bar for guiding the said draw-bar, and the extension of the said draw-bar having an upwardly and outwardly extending extremity provided with an aperture, a plate secured to the said draw-bar and extending outwardly from the end thereof, and having an aperture, the said plate being on a plane below the extension of the draw-bar whereby coupling of the draw-bar to a trailer can be effected on different planes, and means for holding the draw-bar at different positions of adjustment.

HEBER F. TOWNER.
GEORGE DUNTON.